United States Patent [19]
Mous

[11] 3,857,026
[45] Dec. 24, 1974

[54] PROPORTIONAL PULSE GENERATOR

[75] Inventor: Gerarous Adrianus Mous, Overloon, Netherlands

[73] Assignee: Cincinnati Milacron Inc., Cincinnati, Ohio

[22] Filed: Oct. 29, 1973

[21] Appl. No.: 410,880

[30] Foreign Application Priority Data
Mar. 1, 1973  Great Britain................... 10035/73

[52] U.S. Cl............. 235/151.11, 235/152, 318/571, 318/573
[51] Int. Cl........................................... G06f 15/46
[58] Field of Search ....... 235/151.11, 152; 318/570, 318/571, 573

[56] References Cited
UNITED STATES PATENTS

| | | | |
|---|---|---|---|
| 3,428,792 | 2/1969 | Kelling............................ | 318/571 X |
| 3,538,315 | 11/1970 | Reuteler......................... | 235/151.11 |
| 3,701,890 | 10/1972 | Dummermuth............ | 235/151.11 X |

*Primary Examiner*—Eugene G. Botz
*Assistant Examiner*—Jerry Smith

[57] ABSTRACT

A pulse generator for use in a numerical control system wherein the pulse generator accepts pulses from an input pulse train and provides a plurality of digital drive signals corresponding to a plurality of axes of motion. The ratio of the frequencies of the drive signals is determined by the ratio of displacements of the axes of motion, and the highest frequency of the drive signals is approximately equal to the pulse train frequency.

6 Claims, 3 Drawing Figures

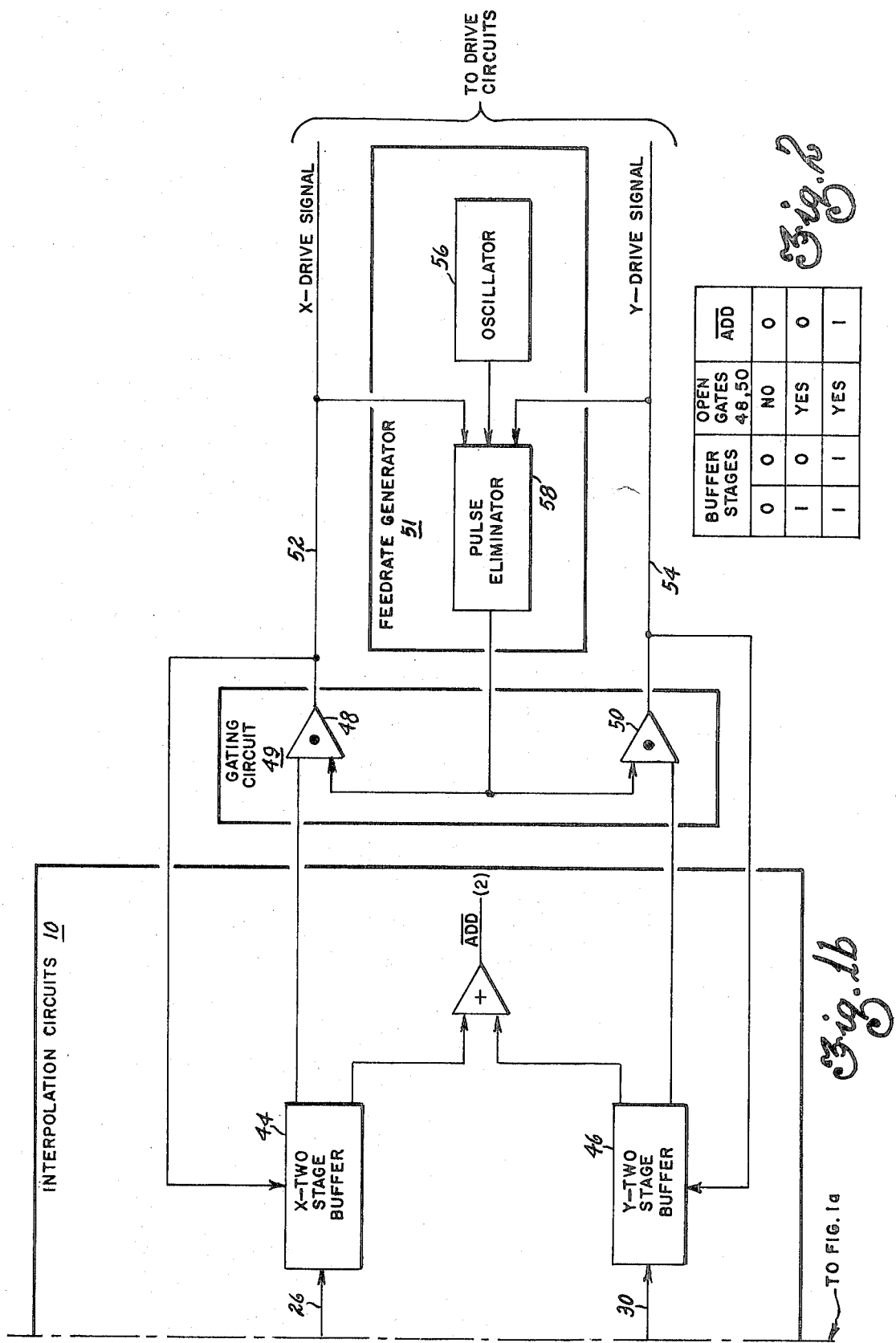

PROPORTIONAL PULSE GENERATOR

BACKGROUND OF THE INVENTION

This invention relates generally to numerical control systems of the type in which a controlled member; e.g., a work table or toolhead of a machine tool, is controlled simultaneously along a predetermined path in two or more axes of motion in accordance with separate drive signals for each axis. Since the extension of the invention to more than two axes will be obvious, the description will largely be confined to two axes.

Historically, numerical controls have been divided into two general categories — contouring control and positioning controls. A contouring control controls the velocity and direction of motion of the controlled member along a predetermined path. Given the displacements to be moved in each axis and the desired resultant velocity, the generation of drive signals requires complex and expensive apparatus. Typically, using the axial displacements, the path vector is calculated and gated with a predetermined vector feedrate signal; and the output thereof is used to control the rate of operation of interpolation circuits. Therefore, to obtain the advantage of moving the controlled member through a predetermined path, one had to use complex and expensive circuitry.

On the other hand, positioning controls which are simpler and inexpensive are only designed to move a controlled member from one point in space to another point, without regard to the path of motion between said points. In pulse generators for use with positioning controls, a maximum input pulse frequency is set; e.g., in the two axis case, at a value such that each feed increment is executed by moving at 45° until the shorter axial displacement has been traversed; and thereafter, the feed increment is executed by moving along one axis only to complete the longer axial displacement. It is an advantage of the present invention that the circuit described can be inserted in a numerical control system of this known nature, and the controlled member can be moved along a predetermined path in space at a velocity representing the maximum oscillator frequency. The system will then interpolate more rapidly and execute feed increments in the direction of the vector defined by the axial displacements rather than as two segments — one at 45° and the other parallel to an axis. Therefore, applicant's pulse generator has the advantages of both traditional types of numerical controls. The pulse generator is simple in structure and therefore inexpensive but has the capability of generating signals for moving a member along a predetermined path in space.

SUMMARY OF THE INVENTION

According to one embodiment of applicant's invention, an apparatus is provided for generating a plurality of digital drive signals causing a movable member to move in at least two axes of motion at a predetermined velocity along a predetermined path. The path of motion is defined by input signals representing displacements along each axis of motion. The apparatus includes means for producing a feed rate signal as a function of predetermined velocity. Further, means are provided for each of the axes of motion which are responsive to the input signals for interpolating said input signals at a fixed rate to produce interpolation signals. The interpolating means is interrupted when the number of interpolation signals produced therefrom exceeds, by a predetermined number, the number of corresponding drive signals produced. Finally, the apparatus contains means responsive to the interpolation signals and the feed rate signals for producing the drive signals for each axis of motion. The drive signals are effective to cause the member to move at the predetermined velocity to the extent of the axial displacements defining the predetermined path.

BRIEF DESCRIPTION OF THE DRAWINGS

FIGS. 1a and 1b when joined along the indicated junction line illustrate a detailed block diagram of the disclosed pulse generator which may be used in a typical numerical control.

FIG. 2 illustrates a truth table defining the operation of the buffer stores which control the operation of the interpolator circuits.

DESCRIPTION OF THE PREFERRED EMBODIMENT

Figure 1A:
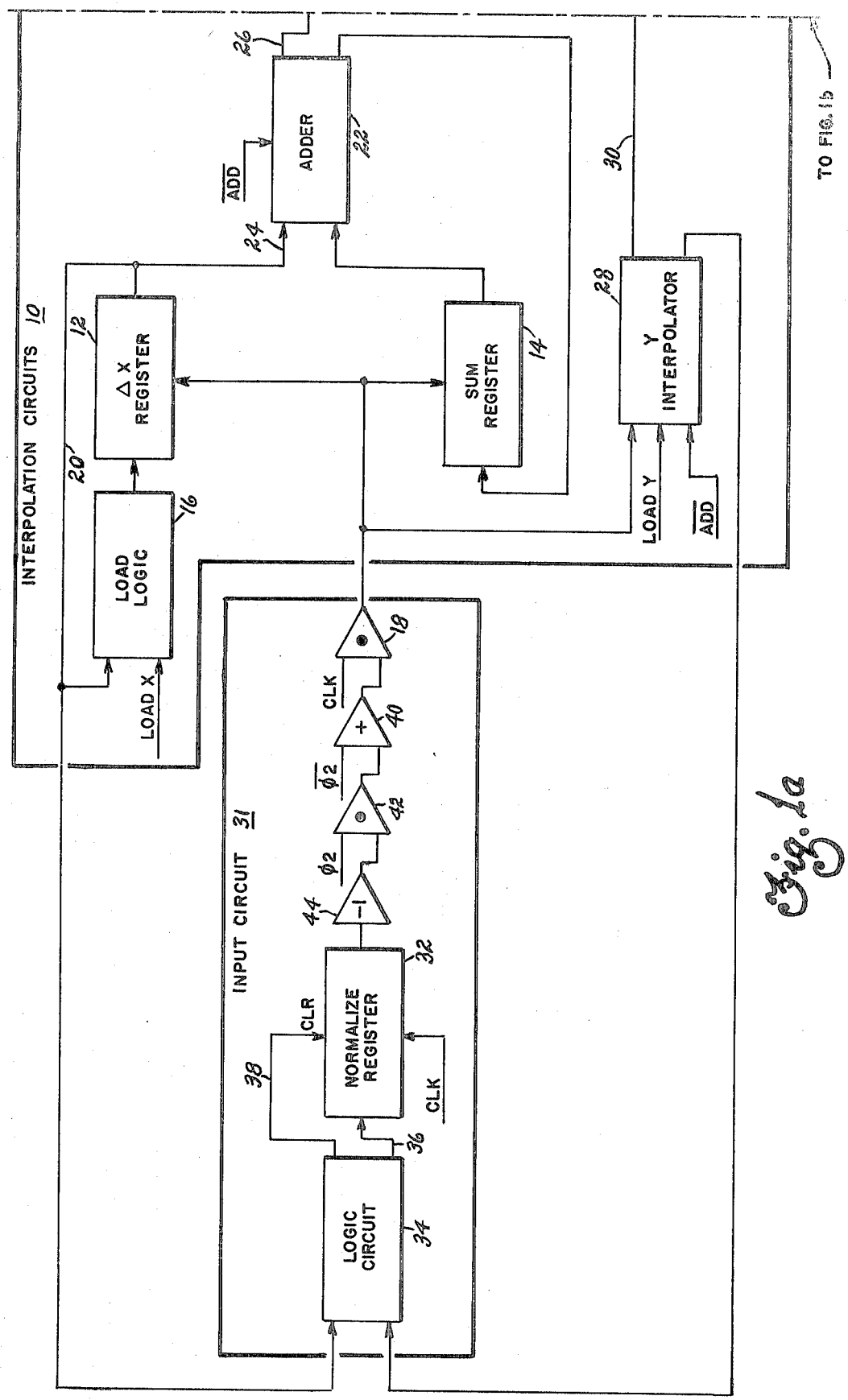

FIGS. 1a and 1b when joined along the indicated junction line illustrate a pulse generator which may be used within a typical numerical control. The other circuits necessary for a complete numerical control are well known in the art, and their present disclosure is unnecessary. Referring to FIG. 1a, within interpolation circuit 10, an input register 12 and sum register 14 for the X-axis of a two axis numerical control system are shown. In a manner well known, the register 12 can be loaded via input logic 16, with a binary number representing an increment of displacement along the X-axis. During normal operation, the gate 18 is enabled by a timing signal $\bar{\phi}_2$ whose significance is explained below. When the gate 18 is open, the contents of the register 12 are continuously recirculated via a connection 20 and the input logic 16 under the control of clock pulses from a clock oscillator (not shown). The clock pulses occur in bursts separated by pulse gaps or dead spaces which give time for the performance of logical operations.

The above operation of the interpolation circuits represents a unique feature of this invention. As mentioned earlier, in typical numerical controls the interpolator circuits are operated by a clock gated with a feed rate signal. In essence, the feed rate of the controlled member is directly controlled by the rate of interpolation. In addition, in prior art controls, a signal representing the vector sum of the axial displacements is calculated either directly or through an approximation. In the pulse generator disclosed herein, the interpolation circuits operate in response to the clock at a fixed rate. However, as will subsequently be explained, the additive process is periodically interrupted upon the occurrence of certain events. Further, a signal representing the vector sum of the axial displacements is not calculated directly or indirectly. However, the pulse generator produces drive signals for moving a member along a predetermined path at a controlled velocity.

The contents of the sum register 14 are also continuously recirculated via an adder 22 having an input 24 connected to the output of the input register 12. When a signal $\overline{ADD}$ is applied to the adder, the input 24 is disabled and the contents of the sum register 14 recirculate unchanged. When $\overline{ADD}$ is false, normal addition takes place and the contents of the sum register 14 are incremented by the magnitude of the X-axis displacement during each recirculation. It is arranged by means of conventional timing techniques that $\overline{ADD}$ can only change state during the aforementioned dead spaces between pulse bursts. The adder 22 has an overflow output 26 on which a pulse appears whenever the sum register 14 overflows, that is to say, whenever the adder generates the carry pulse at the end of a pulse burst.

The circuits described above for the X-axis are duplicated for the Y-axis and, for simplicity, are represented simply by the Y-interpolator block 28 with its overflow pulse output 30.

Although not an essential feature it is desirable to insure that the larger of the axial displacements shall have its most significant bit in the most significant bit position of the corresponding input register. This minimizes the number of recirculations necessary to achieve overflow of the corresponding sum register. This is achieved within an input circuit 31 by use of a normalizing register 32 which functions only during two preliminary recirculations identified by timing signals $\phi_1$ and $\phi_2$ respectively. During $\phi_1$, a logic circuit 34 operates upon each bit emerging from the X-axis input register 12 and each corresponding bit emerging from the X-axis input register 12 and each corresponding bit emerging from the corresponding Y-axis input register. If both bits are false or equal to zero, the logic circuit 34 provides a pulse on output 36. If either bit is true or equal to one, the logic circuit 34 provides a pulse on the output 38. Each pulse on line 36 enters a one in the normalizing register 32. Each pulse on line 38 completely clears the normalizing register 32. It follows that at the end of $\phi_1$ the normalizing register 32 contains as many ones as there are non-significant zeros to the left of whichever of the axial displacements is the greater. During $\phi_2$ every bit emerging from the register 32 prevents a clock pulse from passing through gate 18. This causes the X-axis displacement in the register 12 and the Y-axis displacement in its corresponding register to be shifted one place to the left; i.e., in the direction of increasing significance. Thus, during $\phi_2$ the AND gate 18 can only be enabled via OR gate 40 if an AND gate 42 is enabled. The gate 42 is enabled by the presence of $\phi_2$ and, by virtue of an inverter 44, the absence of a one at the output of the register 32. At all other times, gate 18 is enabled by $\overline{\phi}_2$ via the OR gate 40. It follows that at the conclusion of $\phi_2$ both the axial displacements will have been shifted to the left as many places as there were ones entered into the register 32 during $\phi_1$.

The overflow pulses are applied to two 2-stage buffers 44 and 46 (FIG. 1b). Each buffer counts as illustrated in the truth table in FIG. 2, that is to say by shifting ones in from the left when incremented and shifting ones out to the left when decremented. As soon as at least one buffer is filled; i.e., in its 11 state, the $\overline{ADD}$ signal is produced to interrupt the additive action of the interpolation circuit 10 shown in FIG. 1a. The first state of the buffers 44 and 46 control two AND gates 48 and 50 in a gating circuit 49 so that each of these gates is enabled when the corresponding buffer is half filled; i.e., in its 10 state, see FIG. 2. Therefore, the operation of the interpolator corresponding to the smaller axial displacement will be controlled by the buffer store associated with the larger axial displacement. Consequently, since the numbers in the input registers in the interpolators represent the axial displacements or numbers proportional thereto, the number of overflow pulses for the smaller axial displacement will, if averaged over a suitable length of time, correspond to the ratio of the smaller axial displacement to the larger axial displacement.

Pulses comprising a feed rate signal are generated by a feed rate generator 51 and applied to the two gates 48 and 50. The maximum frequency of the feed rate signal is substantially less than the clock frequency, so much so that there is time between consecutive pulses in the feed rate signal for several interpolation cycles to take place. Consequently, whenever a feed rate pulse arrives, the buffers 44 or 46 associated with whichever of the displacement is the greater will inevitably be in the 10 or 11 states. Therefore, the gates 48 or 50 pertaining to whichever of the axial displacements is the larger will always pass a feed rate pulse, and the other gate will pass that proportion of feed rate pulses determined by the ratio of the smaller displacement to the larger displacement. When either gate 48 or 50 opens, the output thereof decrements the corresponding buffer 44 or 46.

If the X-axis displacement is greater than the Y-axis displacement, an X-axis drive signal appears on line 52 with a frequency corresponding to the feed rate signal, and a Y-axis drive signal appears on line 54 with a frequency corresponding to the product of the frequency of the feed rate signal times the ratio of the Y-axis displacement to the X-axis displacement. If the Y-axis displacement is greater, X-axis drive pulses appear on line 52 according to the product of the frequency of the feed rate pulses times the ratio of the X-axis displacement to the Y-axis displacement; and Y-axis drive pulses appear on line 54 at the frequency of the feed rate pulses. The frequency of the feed rate signal is such that the resultant velocity of the controlled member is approximately equal to the predetermined velocity.

In the illustrated embodiment the feed rate signal is derived from an oscillator 56 producing a pulse train whose maximum frequency corresponds to the maximum permitted velocity of the controller member. The frequency of the oscillator 56 may be fixed or adjusted by means of manual controls or programmed information. A pulse eliminator circuit 58 eliminates such a proportion of the pulses from the pulse train as to yield a frequency value of the feed rate pulses such that the vector sum of the magnitudes of the pulse frequencies on line 52 and 54 is approximately equal to the oscillator frequency. This feature forms no part of the present invention but is utilized to insure that the resultant velocity is approximately equal to the maximum predetermined value. Further explanation of an example of the feed rate generator 51 may be found in our corresponding application filed on Nov. 1, 1973, Ser. No. 411,746, entitled "Hypotenuse Correction Circuit" and assigned to the present assignee.

The frequency of the oscillator 56 can be increased to a maximum value and then decreased to produce controlled acceleration and then deceleration of the controlled member in a manner well known to those who are skilled in the art. When the number of drive pulses on lines 52 and 54 correspond to the magnitudes of the axial displacements, they are terminated. The above determination of the extent of axial movement may be accomplished with end point registers or other means well known in the art. The action of the pulse eliminator 58 and of the gate 50 causes the pulses of the feed rate signal and the drive pulses to be irregularly spaced. It will, therefore, be understood that pulse frequencies are to be interpreted herein as average frequencies.

While the invention has been illustrated in some detail according to the preferred embodiments shown in the accompanying drawings and while the preferred illustrated embodiments have been described in some detail, there is no intention to thus limit the invention to such details. On the contrary, it is intended to cover all modifications, alterations and equivalents falling within the spirit and scope of the appended claims.

What is claimed is:

1. An apparatus for generating at least two sets of drive pulses causing a movable member to move along at least two axes of motion at a predetermined velocity along a predetermined path, said path being defined by input signals representing displacements along each axis of motion, the apparatus comprising:
   a. means responsive to the drive pulses for producing a feedrate signal representing a velocity along one of the axes of motion having the largest displacement;
   b. means responsive to the input signals and the drive pulses for generating a set of overflow pulses for each axis of motion by iteratively incrementing the magnitude of the input signals at a fixed rate, said generating means being interrupted upon a number of overflow pulses for the one of the axes of motion exceeding by a predetermined number the number of corresponding drive pulses produced; and
   c. means responsive to the generating means and the feedrate signal for producing a set of drive pulses for each axis of motion, said drive pulses causing the movable member to move at the predetermined velocity along the predetermined path.

2. An apparatus for generating at least two sets of drive pulses for moving a movable member along at least two axes of motion at a predetermined velocity along a predetermined path, said path being defined by input signals representing displacements along each axis of motion, the apparatus comprising:
   a. means responsive to the drive pulses for producing feedrate pulses representing a velocity along one of the axes of motion having the largest displacement;
   b. means responsive to the input signals for generating a set of overflow pulses for each axis of motion by iteratively incrementing the input signals by their respective magnitudes at a fixed rate;
   c. means responsive to each set of overflow pulses and each set of drive pulses for storing the overflow pulses and eliminating overflow pulses from said storing means in response to the drive pulses, said storing means producing
      1. a first output signal in response to storing a predetermined number of overflow pulses for the one of the axes of motion, said first output signal being operative to inhibit the generating means, and
      2. second output signals in response to the overflow pulses; and
   d. gating means responsive to the second output signals and the feedrate pulses for producing a set of drive pulses for each of the axes of motion.

3. An apparatus for generating at least two sets of drive pulses for moving a movable member along at least two axes of motion at a predetermined velocity along a predetermined path, said path being defined by input signals representing displacements along each axis of motion, the apparatus comprising:
   a. means responsive to the drive pulses for producing feedrate pulses having a frequency representing a velocity along one of the axes of motion having the largest displacement;
   b. means responsive to the input signals for generating a set of overflow pulses for each axis of motion by iteratively producing a sum of increments at a fixed rate, each increment being equal to the magnitude of a corresponding input signal;
   c. means responsive to each set of overflow pulses and each set of drive pulses for storing the overflow pulses and eliminating an overflow pulse from said storing means in response to a corresponding drive pulse; said storing means producing
      1. a first output signal in response to storing a predetermined number of overflow pulses for the one of the axes of motion, said first output signal being operative to inhibit the generating means, and
      2. a second output signal for each axis of motion in response to each corresponding overflow pulse, the magnitude of the second output signal corresponding to the other of the axes of motion being approximately equal to the ratio of the displacement of the other of the axes of motion to the largest displacement; and
   d. gating means responsive to the second output signals and the feedrate pulses for producing a set of drive pulses for each axis of motion, the drive pulses for the other of the axes of motion having a frequency approximately equal to the product of the frequency of the feedrate pulses times the magnitude of the corresponding second output signal.

4. An apparatus for generating at least two digital drive signals causing a movable member to move along at least two axes of motion at a predetermined velocity along a predetermined path, said path being defined by input signals representing displacements along each axis of motion, the apparatus comprising:
   a. means responsive to the drive signals for producing a feedrate signal representing a velocity along one of the axes of motion;
   b. means responsive to the input signals for generating a set of overflow pulses for each of the axes of motion by iteratively producing a sum of increments at a fixed rate, each increment being equal to the magnitude of a corresponding input signal;
   c. means responsive to the drive signals and the generating means for storing each set of overflow pulses and producing a number of output signals, said output signals comprising a first output signal in response to a first predetermined number of overflow pulses stored and a second output signal in response to a second predetermined number of overflow pulses stored;
   d. means responsive to the second output signals and connected to the generating means for inhibiting the generating means in response to the occurrence of the second output signal associated with the one of the axes of motion; and e. means responsive to each of the first output signals, the feedrate signal and connected to the storing means for producing a drive signal for each axis of motion, said drive signals being operative to decrement a corresponding storing means by said first predetermined number and to cause the movable member to move along the predetermined path at the predetermined velocity.

5. An apparatus for generating at least two sets of drive pulses for moving a movable member along at least two axes of motion at a predetermined velocity along a predetermined path, said path being defined by input signals representing displacements along each axis of motion, the apparatus comprising:

a. a plurality of interpolators responsive to the input signals for generating a set of overflow pulses for each axis of motion by iteratively incrementing the magnitude of the input signals at a fixed rate;

b. an input circuit responsive to the input signals and connected to the interpolators for loading the input signals into the interpolators in a manner optimizing the occurrence of the overflow pulses therefrom;

c. a plurality of two-stage buffer stores, each store being responsive to an interpolator and a corresponding set of drive pulses for counting in one direction in response to each overflow pulse and counting in the opposite direction in response to each drive pulse;

d. a logic gate connected between the buffer stores and the interpolators for inhibiting the operation of the interpolators upon either of the buffer stores being filled with overflow pulses;

e. a feedrate circuit being responsive to the drive pulses for producing feedrate pulses; and f. a gating circuit responsive to each set of overflow pulses and the feedrate pulses for producing a set of drive pulses for each axis of motion.

6. The apparatus of claim 5, wherein the feedrate circuit comprises:

a. means for producing a pulse train as a function of the predetermined velocity; and b. means responsive to a set of drive pulses and the pulse train for producing the feedrate pulses having a frequency such that the vector sum of the magnitude of the frequencies of the sets of drive pulses is approximately equal to the magnitude of the predetermined velocity.

* * * * *